Oct. 11, 1966   L. M. GERMAIN   3,278,737
QUOTIENT CIRCUIT
Filed Aug. 3, 1962   2 Sheets-Sheet 1
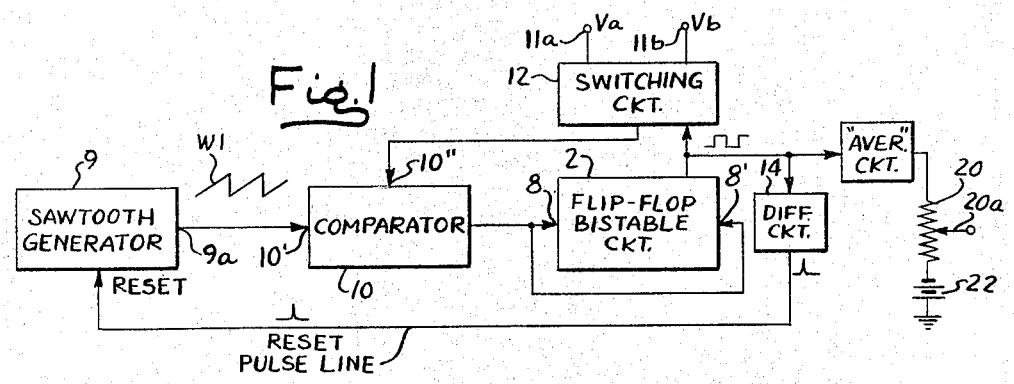
Fig.1
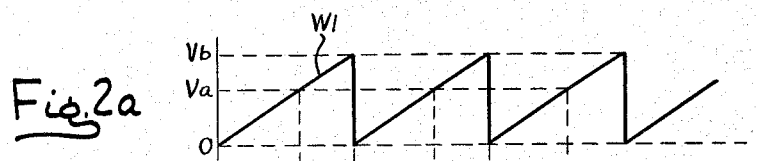
Fig.2a
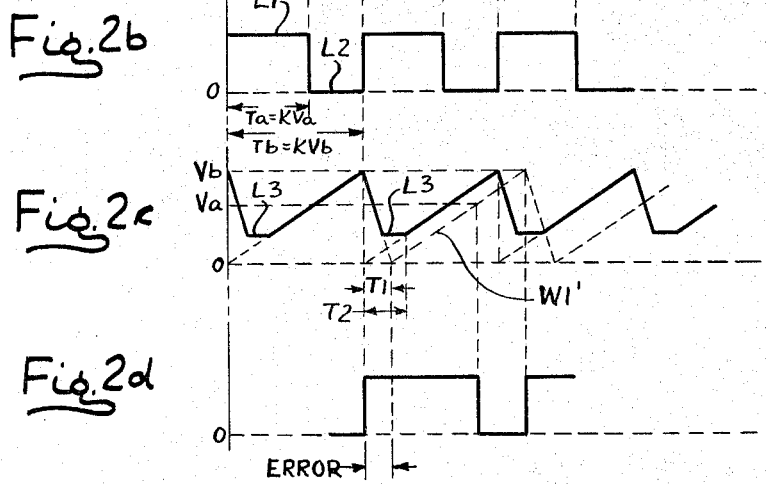
Fig.2b
Fig.2c
Fig.2d
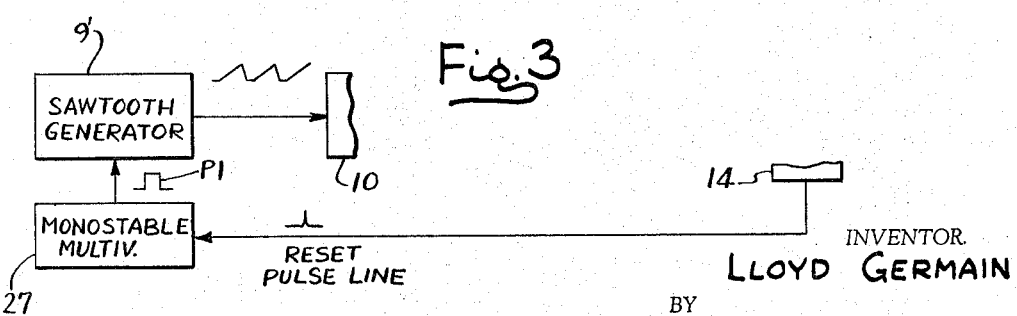
Fig.3
INVENTOR.
LLOYD GERMAIN
BY
ATTYS.

Fig. 4

United States Patent Office 3,278,737
Patented Oct. 11, 1966

3,278,737
QUOTIENT CIRCUIT
Lloyd M. Germain, North Brunswick, N.J., assignor to Gulton Industries, Inc., Metuchen, N.J., a corporation of New Jersey
Filed Aug. 3, 1962, Ser. No. 214,544
7 Claims. (Cl. 235—196)

This invention relates to a circuit for dividing one direct current signal by another.

Numerous circuits have been heretofore developed for dividing one direct current voltage by another, but these circuits have many limitations due to their complexity and low degree of accuracy.

In recent years there has been developed a divider circuit operating on the principle that the average value of a square wave voltage waveform varying between two levels having the same polarity (or wherein one of the levels is zero) is a function of the ratio of the smaller voltage to the large voltage when the higher voltage level is maintained for a period proportional to the smaller of the two voltages involved and the lower voltage level is maintained for a period proportional to the difference between the voltages. The latter requirement is the same as stating that the period of each square wave cycle is proportional to the magnitude of the larger of the two voltages to be divided. The previously developed form of the circuit includes a bistable circuit which in one of its state of operation provides the aforementioned higher voltage level and in its other state of operation provides the aforementioned lower or zero voltage level, and a pair of saw-tooth wave generator circuits for generating a pair of substantially linear saw-tooth voltage waveforms. Control means are provided for synchronizing the saw-tooth wave generating circuits with the operation of the bistable circuit so that one of the saw-tooth waveforms is initiated upon termination of the low voltage level state of the bistable circuit and the other saw-tooth waveform is initiated upon the termination of the high voltage level of the bistable circuit. The timing of the termination of the high and low voltage levels of the bistable circuit is controlled by a pair of comparator circuits one of which compares the smaller of the lower input voltages with one of the saw-tooth waveforms, and the other of which compares a voltage which is the difference between the input voltages and the other saw-tooth waveforms. When the lower input voltage and the former saw-tooth waveform are of comparable values, the associated comparator circuit switches the bistable circuit from its high voltage level state to its low voltage level state. As above indicated, this will initiate the generation of a cycle of the saw-tooth waveform to be compared with the higher input voltage. When the voltage representing the difference between the higher and lower of the input voltages and the latter saw-tooth wave form are of comparable values, the associated comparator circuit resets or switches the bistable circuit to its high voltage level state which initiates generation of a cycle of the saw-tooth waveform to be compared with the lower input voltage. The resulting square wave output of the bistable circuit is fed to an averaging circuit which provides a voltage proportional to the average amplitude of the high and low voltage levels of the bistable circuit which, as above indicated, is an indication of the quotient of the two DC input voltages.

Although this circuit is highly satisfactory for many purposes, there is still room for improvement thereof from the standpoint of simplicity of the circuitry and the accuracy thereof. It is, accordingly, one of the objects of the present invention to provide a divider circuit operating on the general principal of the divider circuit just described but which is a much more simple circuit in that it requires substantially fewer components. A related object of the present invention is to provide a divider circuit as just described which produces more accurate results.

In accordance with one aspect of the present invention, only one saw-tooth wave generator circuit and only one comparator circuit is utilized. The comparator circuit first compares the lower of the input voltages and the output of the saw-tooth waveform and, when a state of comparison exists between these voltages, the bistable circuit is switched from a high voltage level state to a low voltage level state. The saw-tooth waveform, however, continues to increase in magnitude and a timing signal is then derived when the higher of the input voltages and the saw-tooth waveform are of comparable values. This timing signal identifies the end of a period over which the output of the bistable circuit is averaged to obtain the quotient of the two input voltages. In the most preferred form of the invention, this timing signal resets the saw-tooth wave generating circuit so that it initiates a new saw-tooth wave cycle and at the same time resets or returns the bistable circuit to the high voltage level state.

Switching means are provided which are responsive to the high and low voltage level states of the bistable circuit which feeds only the lower of the input voltages to the comparator circuit during the initial comparison operation referred to, and then feeds only the higher of the input voltages to the comparator circuit when the bistable circuit has been switched to its low voltage level output state.

In the specific example of the invention just described, the accuracy of the circuit depends to a great extent upon the linearity of the saw-tooth waveform and to the requirement that the effective value of the waveform be as close to zero as possible at the beginning of each cycle occurring when the bistable circuit is initially reset or switched to its high voltage level state. In other words, where the saw-tooth waveform starts from zero and progressively increases until equality of a saw-tooth waveform and the higher of the input voltage exists, a requirement that the saw-tooth wave generator circuit (which usually operates on a capacitor charge circuit principle) be reset to zero practically instantaneously with the bistable circuit is an extremely difficult one to achieve. In fact, applicant knows of no prior techniques which have achieved an error of small fractions of one percent where capacitor charge circuits are used in the saw-tooth generating circuit.

In accordance with another aspect of the present invention, the control of a saw-tooth wave generator circuit using a capacitor charge circuitry is modified so that accuracies of tenths and even hundredths of a percent are readily achieved. To this end, at the end of each comparison cycle, the saw-tooth output of the saw-tooth wave generator circuit is reset or returned to an intermediate level substantially above zero and below the lowest expected value of the lower of the input voltages and then held at this value for the time interval required for a saw-tooth waveform starting from zero and having substantially the same slope as the waveform involved to reach the intermediate level. At the end of this interval, the saw-tooth begins to progressively increase in the normal manner. In the case where the saw-tooth wave generator utilizes a capacitor charge circuit, in accordance with the aspect of the present invention now being described, the capacitor is only partially discharged to an intermediate level and is maintained at this intermediate level until the end of the interval referred to, whereupon the capacitor is allowed to immediately begin charging once again. This principle of operation substantially eliminates any error due to the finite time it takes to fully discharge a capacitor.

These and other objects, advantages and features of the invention will become apparent upon making reference to the specification to follow, the claims and the drawings wherein:

FIG. 1 is a box diagram of a generalized form of the present invention;

FIG. 2a illustrates the saw-tooth waveform output of the saw-tooth wave generator forming a part of the circuit of FIG. 1;

FIG. 2b illustrates the square wave output of the flip-flop bistable circuit forming a part of the circuit shown in FIG. 1 to the same time base scale as FIG. 2a;

FIG. 2c shows in solid lines the modified saw-tooth waveform output of the saw-tooth wave generator circuit forming a part of the modified circuit of FIG. 3, and in dashed lines a saw-tooth waveform requiring a finite time for resetting, and drawn on the time scale as FIGS. 2a and 2b;

FIG. 2d illustrates the error producing segment introduced in the bistable circuit output by the inability to reset a saw-tooth waveform to zero in zero time in the absence of the present invention; and FIG. 3 is a fragmentary box diagram of a circuit which represents a modification of the circuit of FIG. 1.

It will be recalled that the principle of the divider circuit on which the present invention operates is that the average value of a square wave having an upper and lower level of the same polarity (or where the lower level is zero) is an indication of the ratio of a first direct current (D.C.) voltage to a second and larger D.C. voltage where the duration of the high level of the square wave is proportional to the smaller input voltage and the duration of the low level of the square wave is proportional to the higher input voltage. Refer now to FIG. 1 which illustrates one form of the circuit of the present invention which operates on this principle.

The circuit of FIG. 1 includes a square wave generator circuit preferably in the form of a flip-flop bistable unit 2 which can assume one of two possible states, one being a reset state where a relatively high voltage level representing a level L1 (FIG. 2b) appears at an output 7 and the other being a state where a relatively low voltage level representing a level L2 appears at output 7. As above indicated, the low level L2 could be zero or a finite level of the same polarity as the level L1. The upper and lower levels of the output thereof are controlled by the feeding of properly timed pulses to a pair of inputs 8–8' thereof.

The circuit further includes a saw-tooth generator circuit 9 which provides at an output 9a thereof the waveform W1 (FIG. 2a) having a linearly progressively increasing wave front which preferably terminates in a vertical trailing edge. The period of the saw-tooth waveform W1 corresponds with the period of one cycle of the output of the bistable circuit 2. The saw-tooth output of the saw-tooth generator circuit 9 is fed to an input terminal 10' of a comparator circuit 10 which compares the saw-tooth waveform output of the saw-tooth generator circuit 9 with input voltages Va and Vb fed to a pair of inputs 11a and 11b thereof. Switch control means 12 in conjunction with an electronic or mechanical switch 13 controls which of the input terminals 11a and 11b are connected to a second input terminal 10'' of the comparator circuit. The switch control means 12 is responsive to the output of the bistable circuit 2 so that the low voltage terminal 11a is connected to the comparator circuit 10 when the bistable circuit output is at the high level L1 and the high voltage terminal is connected thereto when the bistable circuit output is at the low voltage level L2.

The comparator circuit 10 controls the timing of the setting and resetting of the bistable circuit 2 in accordance with the comparison between the saw-tooth waveform W1 and the voltages Va and Vb. The comparator means 10 has an output line on which a timing pulse appears first when a state of comparison exists between the saw-tooth waveform W1 and the lower input voltages Va and subsequently when a state of comparison exists between the continually increasing saw-tooth waveform W1 and the higher input voltage Vb. These pulses are fed to the inputs 8 and 8' of the bistable circuit 2 so that the circuit will be switched from the aforesaid high voltage level L1 to the lower level L2 when the first comparison state exists and then from the high back to the low level when the second comparison state exists. The square wave output of the bistable circuit is fed to the switch control means 12 to switch the input voltages as stated above and to a suitable pulse forming circuit 14, such as a differentiating circuit, which provides a timing pulse at each instant the bistable circuit is reset to its high level state. This pulse is fed to the input of the saw-tooth generator 9 to reset the same to initiate a new increasing saw-tooth waveform. As illustrated in FIGS. 1 and 2a, this waveform increases from a zero level.

The output of the bistable circuit is also fed to an averaging circuit 18 which provides a direct current voltage output proportional to the average of the square wave output of the bistable circuit 2. The output of the averaging circuit 18 is shown extending to the upper terminal of a potentiometer 20 whose bottom terminal extends to a biasing voltage source 22. If the output of the averaging circuit 18 is a positive voltage, the lower end of the potentiometer 20 is connected to the negative terminal of the voltage source 22 whose opposite or positive terminal is grounded. The output of the circuit just described is taken between the wiper 20a of the potentiometer and ground. By adjusting the position of the wiper 20a of the potentiometer 20 it is apparent that a zero direct current output voltage can be obtained for any given ratio of Va and Vb such as when Vb equals 2Va. The voltage Va can actually be a modified input voltage such as a voltage twice the value of an actual input voltage Vb'. Thus if Vb' should become greater than the input voltage Va, the output across the wiper 20a and ground will be a positive voltage and, conversely, when the voltage Vb' is greater than the voltage Va, the output across the wiper 20a and ground will be a negative voltage. This arrangement is useful for applications where Va and Vb' may be of comparable values or Vb' can be somewhat greater than Va. One particularly important application of this type of a divider circuit is in the flowmeter system of copending application Serial No. 168,145, filed January 23, 1962.

As previously indicated, where the saw-tooth wave generator 9 includes a capacitor charge circuit which cannot be discharged instantaneously and where the resultant percentage measurement error is not tolerable, the improved circuit of FIG. 3 to be described will overcome the problem. The nature of the error produced when the saw-tooth wave is not returned to zero instantaneously is illustrated by the dashed line saw-tooth waveform W1' of FIG. 2c. It will be noted that it takes a finite time T1 for the saw-tooth waveform to be reset completely to zero. Since the bistable circuit 2 is reset at the beginning of this period T1, the output of the bistable circuit will not be triggered to its lower voltage level L2' (see FIG. 2d) until a time T1 seconds later than that required since the saw-tooth waveform will not reach the level Va until a time T1 after the instant the idealized waveform W1 of FIG. 2a reaches this value. The length of time the bistable circuit remains at its low level is unaffected by the time delay T1 so that the average value of a cycle of the square wave produced in practice will be different than it would be for an idealized saw-tooth waveform W1.

To overcome this problem, in accordance with another aspect of the invention means are provided for returning or resetting the saw-tooth waveform W1' to an intermediate level L3 above zero, and below the lowest expected input voltage Va, and maintaining this level for a time duration T2 (FIG. 2c) which it would take the idealized waveform W1 of the same slope and starting from zero to reach the level L3. The latter means preferably comprises a time delay circuit 27 interposed between the output of the differentiating circuit 14 and the input of a modified saw-tooth wave generator circuit 9'. In the case where the saw-tooth wave generator circuit has a capacitor charge circuit, the capacitor involved need not be fully discharged or partially discharged in a short time. The time delay circuit 27 may be a monostable multivibrator circuit which generates a capacitor dicharging pulse P1 which has the aforesaid duration T2. A biasing circuit to be described will allow the capacitor to discharge to the level L3.

Figure 4:
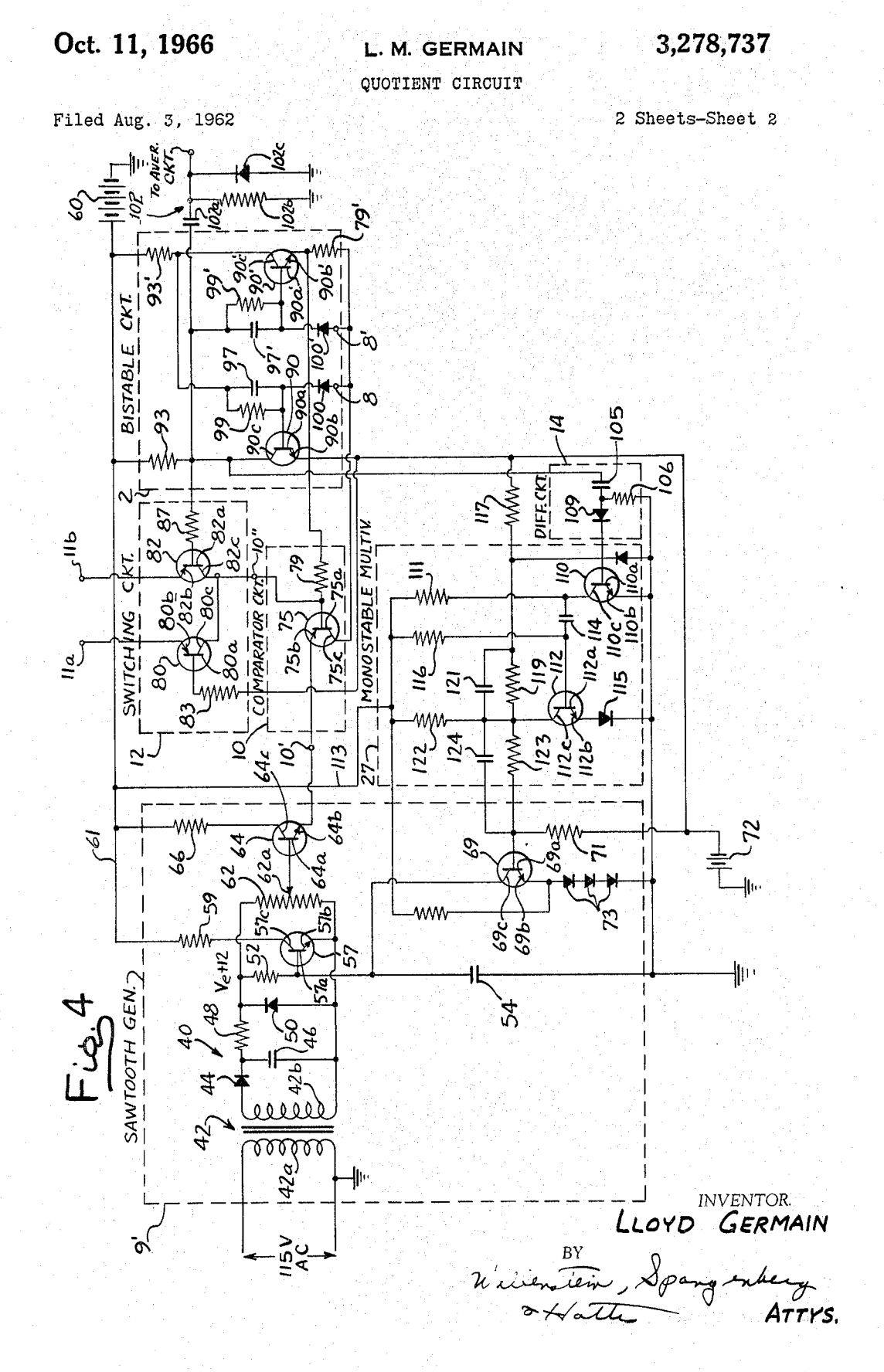

Refer now to FIG. 4 which illustrates an exemplary circuit diagram of the preferred form of the invention illustrated in FIG. 3. The saw-tooth wave generator there shown operates from a regulated power supply generally indicated by reference numeral 40 which includes a transformer 42 having a primary winding 42a connected to a source of commercial alternating current and a secondary winding 42b. One of the secondary windings 42b is coupled through a rectifier 44 to the upper terminal of a filter capacitor 46. The bottom end of the filter capacitor 46 is connected to the bottom end of the secondary winding 42b of the transformer 42. A resistor 48 and a Zener diode 50 is connected in series across the opposite terminals of the filter capacitor 46. The Zener diode 50 provides a fixed D.C. voltage thereacross, for example, 12 volts, which energizes a capacitor charge circuit, including a resistor 52 in series with a capacitor 54. One plate of the capacitor 54 is grounded. The voltage across the capacitor 54 is applied to the base electrode 57a of an NPN transistor 57. The emitter electrode 57b of the transistor 57 is connected to a common line extending to commonly connected terminals of the Zener diode 50, capacitor 46 and secondary winding 42b. The collector electrode 57c of the transistor 57 is connected through a resistor 59 to a positive voltage supply line 61 connected to the positive terminal of a source of D.C. voltage 60. A linear saw-tooth waveform appears between the upper end of resistor 52 and the emitter electrode 57b of the transistor 57 which is applied to the opposite ends of a potentiometer 62. The wiper 62a of the potentiometer 62 is connected to the base electrodes 64a of an NPN transistor 64 forming part of an emitter follower circuit. The collector electrode 64c of the transistor 64 is connected through a resistor 66 to the positive voltage supply line 61. The emitter electrode 64b of the transistor 64 is connected to the input terminal 10' of the comparator circuit 10.

A circuit for discharging the charge capacitor 54 is provided including an NPN transistor 69 having a collector electrode 69c connected to the ungrounded terminal of the capacitor 54 and an emitter electrode 69b connected through a series of semiconductor biasing rectifiers 73 to ground. When the transistor 69 is rendered highly conductive in a manner to be described, the rectifier 73 establishes an intermediate voltage level to which the capacitor 54 discharges. In effect, the rectifiers 73 establish the level L3 (FIG. 2c) for the output of the saw-tooth wave generator. The transistor 69 is normally in a non-conductive state by virtue of the connection of the base electrode 69a of transistor 69 through a resistor 71 to the negative terminal of a source of D.C. voltage 72.

The comparator circuit 10 is a very simple circuit including an NPN transistor 75. The emitter electrode 75b of the transistor 75 is connected to the input terminal 10b of the comparator circuit 10 and the base electrode 75a thereof is connected to the input terminal 10'' of the comparator circuit to which the output of the switching circuit 12 is connected. The collector electrode 75c of the transistor 75 is connected to control terminals 8 and 8' of the bistable circuit 2. A resistor 79 is connected between the base electrode 75a of the transistor 75 and the negative voltage supply line 85 extending to the negative terminal of the D.C. voltage source 72.

The comparator circuit transistor 75 will be rendered conductive whenever the positive going saw-tooth waveform applied to the comparator transistor emitter electrode 75b via the input terminal 10' exceeds the positive voltage applied to the base electrode 75a of the transistor 75 by the switching circuit. When this occurs, the base electrode 75a becomes negative with respect to the emitter electrode 75b to effect a relatively large current flow through the emitter and collector electrodes of the transistor 75. This resulting current flow will produce positive pulses through a resistor 79' connected between the collector electrode 75c and a negative voltage supply line 85 which pulses appear on the bistable circuit control terminals 8 and 8'.

The switching circuit 12 is shown as comprising a pair of NPN switching transistors 80 and 82. The transistor 80 has an emitter electrode 80b extending to the low input voltage terminal 11a. The emitter electrode 82b of the transistor 82 is connected to the high input voltage terminal 11b. The collector electrodes 80c and 82c of transistors 80 and 82 are connected to the input terminal 10'' of the comparator circuit 10. The base electrode 80a of the transistor 80 is connected through a resistor 83 to the negative voltage supply line 85. Initially, the negative voltage fed to the base electrode 80b via the circuit elements just described will render the PNP switching transistor 80 highly conductive effectively to couple the low input voltage on the input terminal 11a to the input terminal 10'' of the comparator circuit 10. At that time, the switching transistor 82 is kept in a non-conductive condition by virtue of the connection of its base electrode 82a through a resistor 87 to a point in the bistable circuit 2 which has a positive voltage during the time the switching transistor 80 is in a conductive state.

The transistor 80 is rendered non-conductive when the transistor 82 is rendered conductive by the output from the bistable circuit 2. In that event, the higher voltage applied to the input terminal 11b will be effectively coupled through the transistor 82 to the collector electrode 80c of the transistor 80 to back-bias the latter transistor in a non-conductive condition.

The bistable circuit 2 as well as the other circuits described may take a variety of forms. In the circuit illustrated, the bistable circuit includes a pair of PNP transistors 90 and 90'. The emitter electrodes 90b and 90b' of these transistors are connected to the negative voltage supply line 85. The collector electrode 90c of the transistor 90 is coupled through a resistor 93 to the positive voltage supply line 61. In a similar way, the collector electrode 90c' of the transistor 90' is coupled through a resistor 93' to the positive voltage supply line 61. The two transistors 90 and 90' are cross coupled by a pair of feedback circuits. One of the feedback circuits includes a capacitor 97 in parallel with a resistor 99 connected between the line leading to the collector electrode 90c' of the transistor 90' and the base electrode 90a of the transistor 90. The other feedback circuit comprises a capacitor 97' and a resistor 99' extending between a line connected to the collector electrode 90c of the transistor 90 and the base electrode 90a' of the transistor 90'. The base electrode 90a of the transistor 90 is connected to the control input terminal 8 of the bistable circuit through a rectifier 100 arranged to couple positive pulses to the latter base electrode and the base electrode 90b' of the transistor 90' is coupled through a similarly connected rectifier 100' to the control terminal 8' of the bistable circuit to couple positive pulses thereto.

The presence of a positive pulse on either of the terminals 8 or 8' will trigger the transistor 90 or 90' then in a non-conductive state into a conductive state to switch the states of the transistors 90 or 90'. The connection between the transistor 90 and 90' are such that only one of the transistors will be conductive at any given time.

The voltage at the collector electrode 90c of the transistor 90 varies between a positive voltage level and a negative voltage level. As previously indicated, it is desirable that the square wave output of the bistable circuit vary between levels which are not of dissimilar polarities. To this end, a clamping circuit 102 is connected to the collector electrode 90c of the transistor 90. The clamping circuit includes a capacitor 102a in series with a resistor 102b connected to ground. A rectifier 102c is connected in parallel with the resistor 102b, the rectifier establishing ground as one of the levels of the output of the bistable circuit taken at the anode of the rectifier. The rectifier 102c establishes a short time constant for a negative voltage fed to capacitor 102a and establishes a long time constant for a positive voltage fed to capacitor 102a, so that the positive going portion of the square wave at the collector electrode 90c of the transistor 90 will appear across the resistor 102b as a postive voltage having the peak-to-peak amplitude of the square wave and the negative going portions of the square wave will appear as zero voltage or ground across the resistor 102b.

The output of the clamping circuit 102 is fed to the averaging circuit 20 (not shown in FIG. 4) which may take a variety of forms as, for example, a simple filter circuit like the filter circuit of the power supply of the saw-tooth wave generator 9'.

As previously indicated, synchronizing signals are derived from the bistable circuit 2 which control the timing of the saw-tooth wave generator 9'. To this end, a line 104 is provided which extends from the collector electrode 90c of transistor 90 to couple the square wave output of the bistable circuit 2 to differentiating circuit 14. As illustrated in FIG. 4 this circuit comprises a capacitor 105 in series with a resistor 106 connected to a ground line 107. The differentiating circuit 14 provides a series of positive and negative pulses across resistor 106 which are coincident respectively with the leading and trailing edges of the square wave signal fed thereto. These pulses are fed through a rectifier 109 which passes only the positive going pulses. These positive pulses which act as reset initiating pulses are fed to the monostable multivibrator 27.

The monostable multivibrator circuit 27 includes a pair of NPN transistors 110 and 112. The output side of the rectifier 109 is connected to the base electrode 110a of the transistor 110. The emitter electrode 110b of transistor 110 is connected to the ground line 107. The collector electrode 110c thereof is connected through a resistor 111 to a line 113 leading to the positive voltage supply line 61 and also through a capacitor 114 connected to the base electrode 112a of the transistor 112. A resistor 116 is connected between a positive line 113 and the juncture between the base electrode 112a and the capacitor 114 so as initially to couple a positive voltage to the transistor 112 to render the same conductive. This represents the stable condition of the monostable multivibrator circuit wherein the other transistor 110 is rendered non-conductive by virtue of the negative potential fed to the base electrode 110a of the transistor 110 through a circuit including a line 115 and a resistor 117 connected to the negative voltage supply line 85. The emitter electrode 112b of the transistor 112 is coupled through a rectifier 115 to the ground line 107.

The multivibrator circuit 27 has a feedback network comprising a resistor 119 in parallel with a capacitor 121 connected between the collector electrode 112c of the transistor 112 and the base electrode 110a of the transistor 110. The collector electrode 112c of the transistor 112 is also connected to the positive power supply line 113 through a resistor 122.

In the stable condition of the monostable multivibrator circuit, the collector electrode 112c of the transistor 112 will be at substantially ground potential. This condition will assure the non-conduction of the discharge capacitor 54 forming a part of the saw-tooth wave generator circuit 9' by virtue of the previously described connection of the base electrode 69a of the transistor 69 through a resistor 71 connected to the negative terminal of the negative voltage supply 72. Whenever a positive pulse is coupled from the differentiating circuit 14 to the base electrode 110a of the transistor 110, the latter transistor will be rendered conductive which will suddenly drop the voltage at the collector electrode 110c thereof. This drop in voltage will suddenly be applied through the capacitor 114 to the base electrode 112a of the transistor 112 rendering the same non-conductive for a time interval depending upon the discharge time of the capacitor 114. The non-conductive condition of transistor 112 will result in a positive voltage at the collector electrode 112c which is applied through a resistor 123 in parallel with a capacitor 124 to the base electrode 69a of the discharge transistor 69. The transistor 69 then becomes conductive to discharge capacitor 54 to intermediate level L3 which persists until the stable state of multivibrator circuit 27 is re-established. As is apparent from the previous description of the principle of operation of the circuit, the time constant of the capacitor discharge circuit is such that the unstable condition of the multivibrator circuit will last for the time interval T2 (see FIG. 2). Then, the initial stable conductive and non-conductive states of the transistors 112 and 110 will resume allowing recharging of the capacitor 54 until the feeding of the next positive reset pulse to the input of the monostable multivibrator circuit 27.

The present invention has provided an extremely accurate, stable and simple divider circuit where percentage errors as low as .05 percent have been achieved wtih the circuit described.

It should be understood that numerous modifications may be made in the preferred form of the present invention described above without deviating from the broader aspects of the present invention.

What I claim as new and desired to protect by Letters Patent of the United States is:

1. An electrical divider circuit responsive to the ratio of a first input signal to a second higher input signal, said circuit comprising: a saw-tooth wave generator for cyclically generating a substantially linear saw-tooth output waveform having a leading side of progressively increasing magnitude, a square wave generator having a high D.C. level output state and a low D.C. level output state, comparator circuit means having a pair of input terminals to which the signals to be compared are fed, means connecting the output of said saw-tooth wave generator circuit to one of said comparator input terminals, switching circuit means having an input for connection to said first and second input signals, and an output connected to the other of said comparator input terminals, said switching circuit means including means for coupling the lower of said input signals to the latter comparator input terminal when the square wave generator means is in its high level output state and for connecting the higher of said input signals to said latter comparator input terminal when the square wave generator is in its low level output state, said comparator circuit means including means for initiating the operation of the high level state of said square wave generator when said comparator circuit means senses comparable values of said saw-tooth waveform and the higher of said input signals are for initiating operation of the low level state of said square wave generator when said comparator circuit means senses comparable values of said saw-tooth wave and the lower input signals, means for operating said saw-tooth wave generator to initiate a new saw-tooth wave cycle upon the termination of the low level state of said square wave generator, and means responsive to the average value of the square wave output of said square wave generator.

2. An electrical divider circuit comprising: a saw-tooth wave generator for cyclically generating a substantially linear saw-tooth output waveform having a leading side of progressively increasing magnitude, bistable circuit means providing a first relatively high D.C. output level in a first state thereof and a second relatively low D.C. level in a second state thereof, a pair of D.C. signal sources providing a pair of D.C. input signals of the same polarity whose magnitudes are to be divided, amplitude comparator circuit means having a pair of input terminals for a pair of D.C. signals to be compared, switching circuit means for coupling either one of said input signals to one of the input terminals of said comparator circuit means, said switching circuit means including means responsive to the high D.C. level of the output of said bistable circuit means for coupling the lower of said input signals to said one input terminal of said comparator circuit means and responsive to the lower D.C. level of the output of said bistable circuit means for coupling the higher of said input signals to said one terminal of said comparator circuit means, said amplitude comparator circuit means including means for initiating the low D.C. level state of said bistable circuit means when the amplitude of said saw-tooth waveform and the lower of said input signals fed thereto are of comparable values and means for initiating the high D.C. level state of said bistable circuit means at a given predetermined point in each cycle of the output of said saw-tooth wave generator prior to the time the leading edge of the saw-tooth waveform reaches the level of the lower of the input signals, and means responsive to the average value of the output of said bistable circuit means over a time period beginning with the initiation of said high level state of said bistable circuit means and terminating at the instant the comparator circuit means senses comparable values of said saw-tooth waveform and the higher of said input signals.

3. An electrical divider circuit for providing a D.C. output whose amplitude is proportional to the ratio of a first to a second and larger D.C. input signal, said first and second input signals respectively having magnitudes $E1$ and $E2$ which are not of dissimilar polarities, said divider circuit comprising: a first pair of signal input terminals to which the two D.C. input signals to be divided are fed, a bistable circuit having an output at which appears a signal having a first relatively high D.C. level when it is in a first state of operation and a second relatively low D.C. level when it is in a second state of operation, bistable control means for alternately operating said bistable circuit in said first and second states of operation to provide a square wave signal at said output, said control means including a saw-tooth wave generator having a first condition where a progressively increasing output signal waveform is generated starting from an intermediate level above zero and terminating at a second and higher level and a second condition where the output signal waveform reduces to and remains at said intermediate level, an amplitude comparator for comparing two D.C. signals, means for coupling the saw-tooth signal output of said saw-tooth wave generator and the one of said first pair of input terminals to which the lower input signal is fed to the comparator when the bistable circuit is in its first high level state of operation and for connecting the signal output of said saw-tooth wave generator and the other of said first pair of input terminals to which the higher input signal is fed to the capacitor when the bistable circuit is in its second low level state of operation, said comparator including means for switching the bistable circuit to its second low level state of operation when the saw-tooth and lower input signals fed thereto are of comparable values and for resetting the bistable circuit to its first high level state of operation when the saw-tooth and higher input signals fed thereto are of comparable values, means responsive to the switching of said bistable circuit from said second low level to said first high level state of operation for momentarily operating said saw-tooth wave generator in said second condition to reset the output saw-tooth signal waveform thereof to said intermediate level for the time interval required for a waveform starting from zero and having substantially the same slope as said progressively increasing waveform to reach said intermediate level and then immediately permitting the saw-tooth wave generator to increase progressively to said second level, and means responsive to the average value of the square wave signal output of said bistable circuit varying between said high and low D.C. levels.

4. An electrical divider circuit for providing a D.C. output whose amplitude is proportional to the ratio of a first to a second and larger D.C. input signal, said first and second input signals respectively having magnitudes $E1$ and $E2$ which are not of dissimilar polarities, said divider circuit comprising: a first pair of signal input terminals to which the two D.C. input signals to be divided are fed, a bistable circuit having an output at which appears a signal having a first relatively high D.C. level when it is in a first state of operation and a second relatively low D.C. level when it is in a second state of operation, bistable control means for alternately operating said bistable circuit in said first and second states of operation to provide a square wave signal at said output, said control means including a saw-tooth wave generator having a first condition where a progressively increasing output signal waveform is generated starting from an intermediate level above zero and terminating at a second and higher level and a second condition where the output signal waveform reduces to and remains at said intermediate level, an amplitude comparator for comparing two D.C. signals, means for coupling the saw-tooth signal output of said saw-tooth wave generator and the one of said first pair of input terminals to which the lower input signal is fed to the comparator when the bistable circuit is in its first high level state of operation and for connecting the signal output of said saw-tooth wave generator and the other of said first pair of input terminals to which the higher input signal is fed to the capacitor when the bistable circuit is in its second low level state of operation, said comparator including means for switching the bistable circuit to its second low level state of operation when the saw-tooth and lower input signals fed thereto are of comparable values and for resetting the bistable circuit to its first high level state of operation when the saw-tooth and higher input signals fed thereto are of comparable values, means responsive to the switching of said bistable circuit from said second low level to said first high level state of operation for momentarily operating said saw-tooth wave generator in said second condition to reset the output saw-tooth signal waveform thereof to said intermediate level for the time interval required for a waveform starting from zero and having substantially the same slope as said progressively increasing waveform to reach said intermediate level and then immediately permitting the saw-tooth wave generator to increase progressively to said second level, said last mentioned means including monostable multivibrator means triggered by the switching of said bistable circuit from said low to said high level state of operation for holding said saw-tooth wave generator in said second condition for said time interval, and means responsive to the average value of the square wave signal output of said bistable circuit varying between said high and low D.C. levels.

5. An electrical divider circuit for providing a D.C. output whose amplitude is proportional to the ratio of a first to a second and larger D.C. input signal, said first and second input signals respectively having magnitudes $E1$ and $E2$ which are not of dissimilar polarities, said divider circuit comprising: a first pair of signal input terminals to which the two D.C. input signals to be divided are fed, a bistable circuit having an output at which appears a signal having a first relatively high D.C. level when it is in a first state of operation and a second relatively low D.C. level when it is in a second state of operation, bistable control means for alternately operating said bistable circuit in said first and second states of operation to provide a square wave signal at said output, said control means including a saw-tooth wave generator having a capacitor charge circuit including a capacitor which charges progressively starting from an intermediate level above zero and terminating at a second and higher level and a capacitor discharge circuit which when activated discharges the capacitor to and maintains the voltage across the capacitor at said intermediate level, an amplitude comparator having a pair of signal input terminals to which signals to be compared are fed, means for connecting the output of said saw-tooth wave generator to one of said comparator input terminals, switching means for connecting the signal input terminal of said first pair of terminals to which the lower input signal is connected to the other comparator signal input terminal when said bistable circuit is in said first high level state of operation, and for connecting the other of said first pair of signal input terminals to said other compaartor signal input terminal when said bistable circuit is in said second low level state of operation, said comparator including means responsive to the sensing of comparable values of the signals fed to the input terminals thereof for switching the state of operation of said bistable circuit from said first high level to said second low level state of operation when the lower of the input signals and said saw-tooth waveform are of comparable values, and from said second low level to said first level state of operation when the higher of said input signals and said saw-tooth waveform are of comparable values, saw-tooth wave resetting means responsive to the switching of said bistable circuit from said second low level to said first high level state of operation for momentarily de-activating said capacitor discharge circuit for the time duration required for a progressively increasing waveform starting from zero and having substantially the same slope as the charge waveform across said capacitor to reach said given intermediate level and then immediately permitting the capacitor to charge toward said second level, and means responsive to the average value of said output of said bistable circuit.

6. An electrical divider circuit for providing a D.C. output whose amplitude is proportional to the ratio of a first to a second and larger D.C. input signal, said first and second input signals respectively having magnitudes $E_1$ and $E_2$ which are not of dissimilar polarities, said divider circuit comprising: a first pair of signal input terminals to which the two D.C. input signals to be divided are fed, a bistable circuit having an output at which appears a signal having a first relatively high D.C. level when it is in a first state of operation and a second relatively low D.C. level when it is in a second state of operation, bistable control means for alternately operating said bistable circuit in said first and second states of operation to provide a square wave signal at said output, said control means including a saw-tooth wave generator having a capacitor charge circuit including a capacitor which charges progressively starting from an intermediate level above zero and terminating at a second and higher level and a capacitor discharge circuit including switch means shunting said capacitor and which when in a low impedance state discharges the capacitor to and maintains the voltage across the capacitor at said intermediate level, an amplitude comparator having a pair of signal input terminals to which signals to be compared are fed, means for connecting the output of said saw-tooth wave generator to one of said comparator input terminals, switching means for connecting the signal input terminal of said first pair of terminals to which the lower input signal is connected to the other comparator signal input terminal when said bistable circuit is in said first high level state of operation, and for connecting the other of said first pair of signal input terminals to said other comparator signal input terminal when said bistable circuit is in said second low level state of operation, said comparator including means responsive to the sensing of comparable values of the signals fed to the input terminals thereof for switching the state of operation of said bistable circuit from said first high level to said second low level state of operation when the lower of the input signals and said saw-tooth waveform are of comparable values, and from said second low level to said first high level state of operation when the higher of said input signals and said saw-tooth waveform are of comparable values, saw-tooth wave resetting means responsive to the switching of said bistable circuit from said second low level to said first high level state of operation for momentarily operating said switch means of said capacitor discharge circuit to said low impedance state for the time duration required for a progressively increasing waveform starting from zero and having substantially the same slope as the charge waveform across said capacitor to reach said given intermediate level and then immediately permitting the capacitor to charge toward said second level, and means responsive to the average value of said output of said bistable circuit.

7. An electrical divider circuit for providing a D.C. output whose amplitude is proportional to the ratio of a first to a second and larger D.C. input signal, said first and second input signals respectively having magnitudes $E_1$ and $E_2$ which are not of dissimilar polarities, said divider circuit comprising: a first pair of signal input terminals to which the two D.C. input signals to be divided are fed, a bistable circuit having an output at which appears a signal having a first relatively high D.C. level when it is in a first state of operation and a second relatively low D.C. level when it is in a second state of operation, bistable control means for alternately operating said bistable circuit in said first and second states of operation to provide a square wave signal at said output, said control means including a saw-tooth wave generator having a capacitor charge circuit including a capacitor which charges progressively starting from an intermediate level above zero and terminating at a second and higher level and a capacitor discharge circuit including switch means shunting said capacitor and which when in a low impedance state discharges the capacitor to and maintains the voltage across the capacitor at said intermediate level, an amplitude comparator having a pair of signal input terminals to which signals to be compared are fed, means for connecting the output of said saw-tooth wave generator to one of said comparator input terminals, switching means for connecting the signal input terminal of said first pair of terminals to which the lower input signal is connected to the other comparator signal input terminal when said bistable circuit is in said first high level state of operation, and for connecting the other of said first pair of signal input terminals to said other comparator signal input terminal when said bistable circuit is in said second low level state of operation, said comparator including means responsive to the sensing of comparable values of the signals fed to the input terminals thereof for switching the state of operation of said bistable circuit from said first high level to said second low level state of operation when the lower of the input signals and said saw-tooth waveform are of comparable values, and from said second low level to said first high level state of operation when the higher of said input signals and said saw-tooth waveform are of comparable values, differentiating circuit means for producing a triggering pulse coincidentally with each switching of said bistable circuit from said second low level to said first high level state of operation, saw-tooth wave resetting means responsive to said triggering pulse for momentarily operating said switch means of said capacitor discharge circuit to said low impedance state for the time duration required for a progressively increasing waveform starting from zero and having substantially the same slope as the charge waveform across said capacitor to reach said given intermediate level and then immediately permitting the capacitor to charge toward said second level, said sawtooth wave resetting means including monostable multivibrator means which is triggered by said triggering pulse and produces a pulse of said duration which operates said switching means of said discharge circuit in said low impedance state for the duration thereof, and means responsive to the average value of said output of said bistable circuit.

References Cited by the Examiner
UNITED STATES PATENTS

| | | | |
|---|---|---|---|
| 2,397,540 | 4/1946 | Dome. | |
| 3,024,999 | 3/1962 | Heacock | 235—196 |
| 3,205,348 | 9/1965 | Kleinberg | 235—196 |

MALCOLM A. MORRISON, *Primary Examiner.*

K. W. DOBYNS, *Assistant Examiner.*